United States Patent [19]
Paice

[11] Patent Number: 5,124,904
[45] Date of Patent: Jun. 23, 1992

[54] OPTIMIZED 18-PULSE TYPE AC/DC, OR DC/AC, CONVERTER SYSTEM

[75] Inventor: Derek A. Paice, Palm Harbor, Fla.

[73] Assignee: Westinghouse Electric Corp., Pittsburgh, Pa.

[21] Appl. No.: 674,815

[22] Filed: Mar. 22, 1991

Related U.S. Application Data

[63] Continuation-in-part of Ser. No. 569,105, Aug. 17, 1990, abandoned.

[51] Int. Cl.⁵ .................. H02M 7/08; H02M 7/162
[52] U.S. Cl. ............................ 363/3; 363/70
[58] Field of Search ................... 363/2, 3, 5-7, 363/69, 70, 44, 45

[56] References Cited

U.S. PATENT DOCUMENTS 4,876,634 10/1989 Paice ........................... 363/5

FOREIGN PATENT DOCUMENTS 748728 7/1980 U.S.S.R. ........................ 363/5
991561 1/1983 U.S.S.R. ....................... 363/70
2108784 5/1983 United Kingdom ............ 363/44

Primary Examiner—William H. Beha, Jr.
Attorney, Agent, or Firm—M. J. Moran

[57] ABSTRACT

A 18-pulse converter system operates without interphase transformer and neutral point on the DC side by providing three rectifier bridges across the DC terminals, one rectifier bridge being coupled with the AC terminals and the two other rectifier bridges being operated at + and −40 degress phase shift, while the rectifier devices are controlled for 40-degree current conduction.

12 Claims, 18 Drawing Sheets

OPTIMIZED 18-PULSE TYPE AC/DC, OR DC/AC, CONVERTER SYSTEM

RELATED APPLICATION

The application is a continuation-in-part of application Ser. No. 07/569,105, filed Aug. 17, 1990, now abandoned.

FIELD OF INVENTION

The invention relates to static AC-to-DC converters, such as can be used for AC or DC motors.

BACKGROUND OF THE INVENTION

One main problem with static AC-to-DC converters, such as can be used for AC or DC motors, is the generation of harmonics on the AC lines, which are caused by the rectification process. Another problem is cost. The use of transformers and filtering inductances, the rating involved, all require a minimization of components, windings and rectifying devices without losing the benefits of the overall system.

It has been shown in U.S. Pat. No. 4,876,634 of Derek A. Paice how a multiphase AC/DC converter can be designed with a single transformer having successive tappings drawn from a polygonal succession of long and short windings, the difference between outputted currents being derived from the tappings. For the purpose of describing the closest art, the U.S. Pat. No. 4,876,634 is hereby incorporated by reference.

SUMMARY OF THE INVENTION

The object of the present invention is to design an 18-pulse converter system which has optimized structural and functional characteristics. The invention involves three 6-pulse rectifier bridges directly connected in parallel with the DC terminals, two of the bridges operating under respective +40 degree and −40 degree phase shift relative to the AC lines, and the third or central bridge being directly connected to the AC lines, the rectifiers being controlled for 40-degree current condition. The invention can be applied to five of such 3-phase rectifier bridges, for a 30-pulse system wherein the displacements are ±48°; ±24° relative to the central bridge. The invention is applicable, in the same vein, to a 7-bridge pulse system, to a nine-bridge pulse system, or more.

DESCRIPTION OF THE INVENTION

The invention relates to an 18-pulse AC-to-DC converter arrangement using special autotransformer connections with an appropriate phase shift and a selected conduction angle in order to eliminate the need for interphase transformers. This arrangement, when combined with appropriate AC line reactances, leads to the generation of input line harmonic currents in the AC lines which are easily reduced to less than 1½% of the fundamental current, a substantial improvement over the prior art. Where the harmonic currents generated by an AC-to-DC converter must be reduced to values lower than those attainable with a 12-pulse arrangement, this particular 18-pulse design becomes desirable. This approach rests upon the observation that the idealized harmonic currents have frequencies of (18 k±1) with amplitudes of 1/(18 k±1). Prior art 18-pulse techniques have encountered practical connection difficulties because of the large rating of associated phase-shifting and interphase transformers.

Three-phase rectifier bridge arrangements typically involve a single 3-pulse converter group combining three SCR devices, or 3 diodes, with a 120° period of current conduction. With this approach, however, there will be a need for an interphase transformer and for providing a neutral reference point between the bridges. The present invention no longer requires an interphase transformer, nor a neutral reference point between the rectifier bridges.

Figure 1:
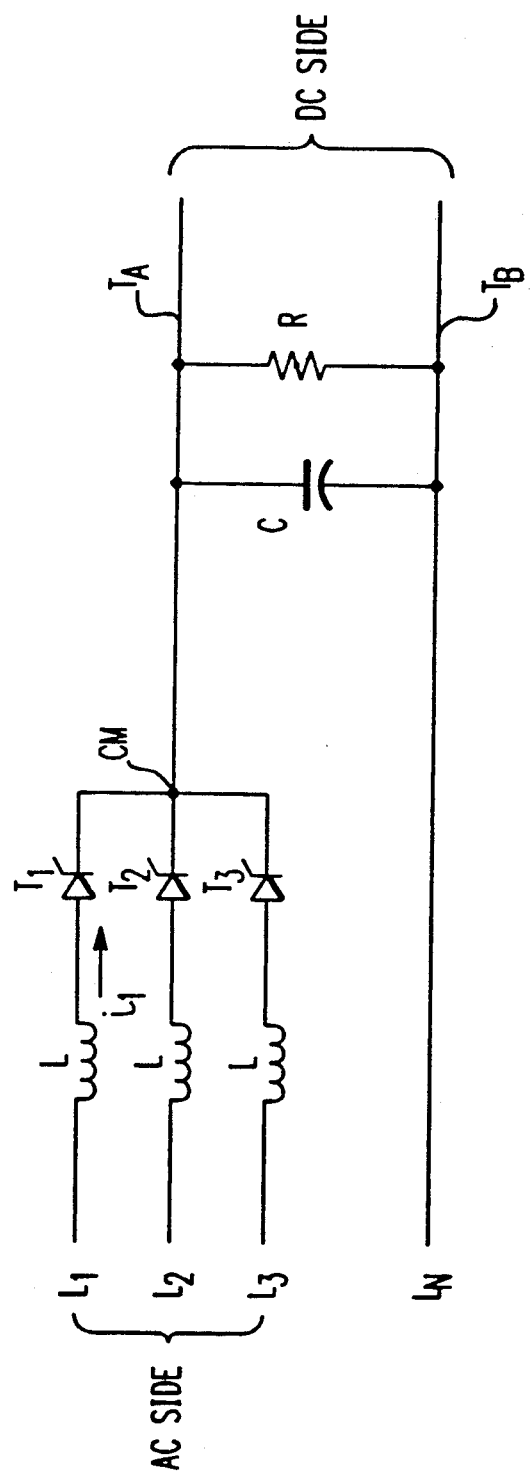
FIG. 1 shows a 3-pulse converter system formed with a single rectifier group with a neutral line return for the three AC phases, in an unsmoothed DC current operation.

Referring to FIG. 1, a basic 3-phase rectifier group is shown which, because it lacks smoothing inductors on the DC side, allows a significant ripple amount on the DC load. This group includes three SCR devices T1, T2, T3 connected to the AC power supply lines L1, L2, L3 through inductances L. Their common junction point CM is connected to the positive DC terminal TA. The neutral return line is TN derived from the DC terminal TB. Between the two DC terminals are a capacitor C and a resistor R, as generally known. The system operates to convert AC power into DC power or, conversely, DC power into AC power, depending upon where the supply and the load is. The line currents are shown applied through the inductance L so as to limit the rate of change of current and provide some reduction in the line current harmonics. The AC currents, such as il on FIG. 1, contain a DC component and a significant amount of third harmonic current. Although this is a workable circuit, it is rarely used for higher power applications because of the distortion and the unfavorable loading exerted upon the supply.

Figure 2:
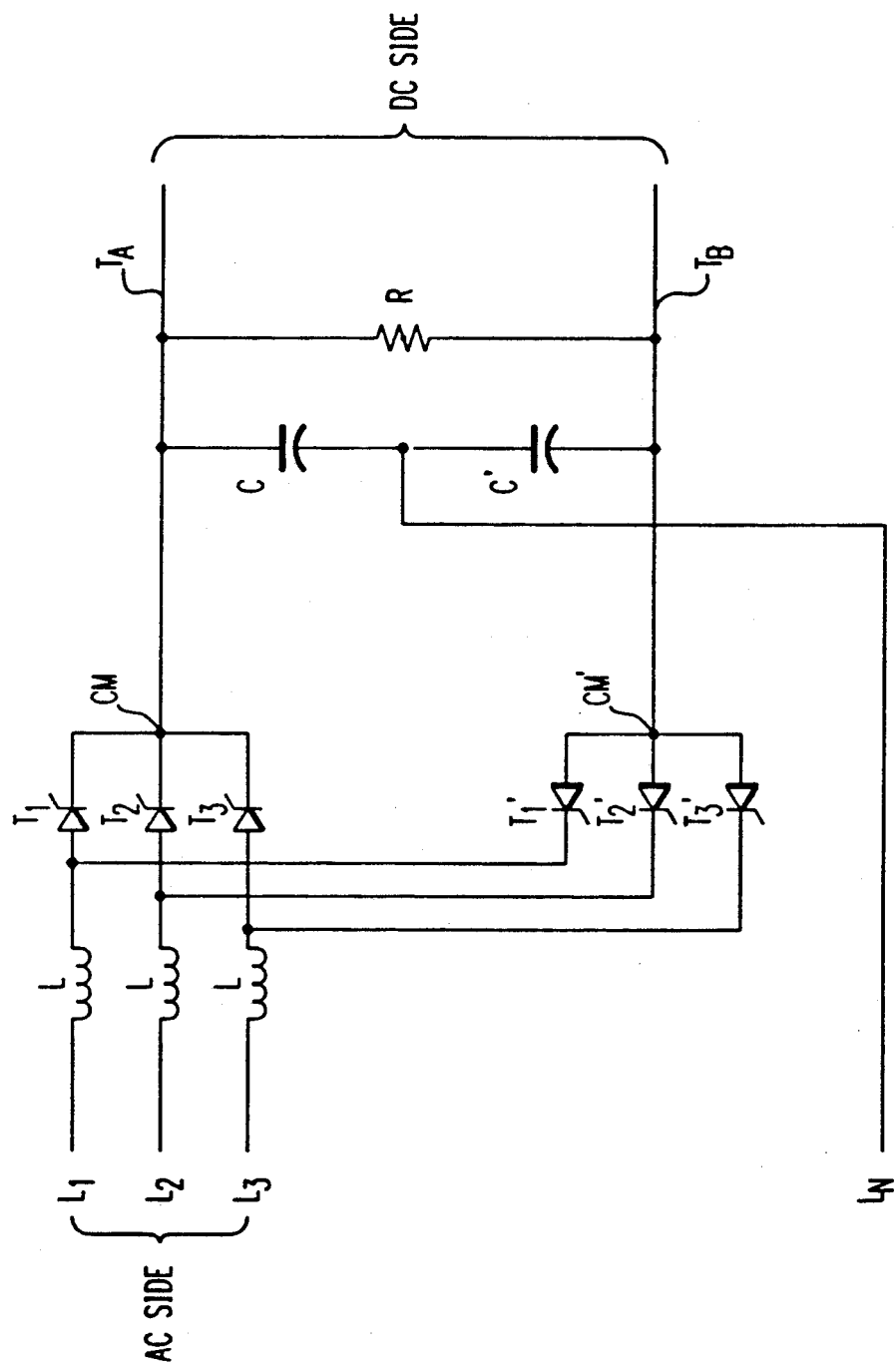
FIG. 2 shows a system combining two 3-pulse converters formed with two groups of rectifiers and a neutral line return for the three AC phases, in an unsmoothed DC current operation.

FIG. 2 shows two such "building blocks", T1, T2, T3, and T'1, T'2, T'3 with their common junction points CM, CM', respectively, and a common neutral point N (located between two capacitors C and C') for the return neutral line LN. This common neutral connection is used so as to eliminate the DC component in the supply. Nevertheless, there remains a large third harmonic component of current drawn from the AC source. By providing a neutral point N which does not return to the AC power supply, the third harmonic no longer circulates through the AC source. This is shown on FIG. 3 through the provision of a zig-zag interphase transformer TNF with primary windings W1, W2, W3 associated with the three AC lines L1, L2, L3 and crisscrossed secondary windings W'1, W'2 and W'3 converging, via line TN, with the neutral N located at the center point between capacitors C and C'. However, a significant third harmonic component of current still flows through the center point N.

Figure 3:
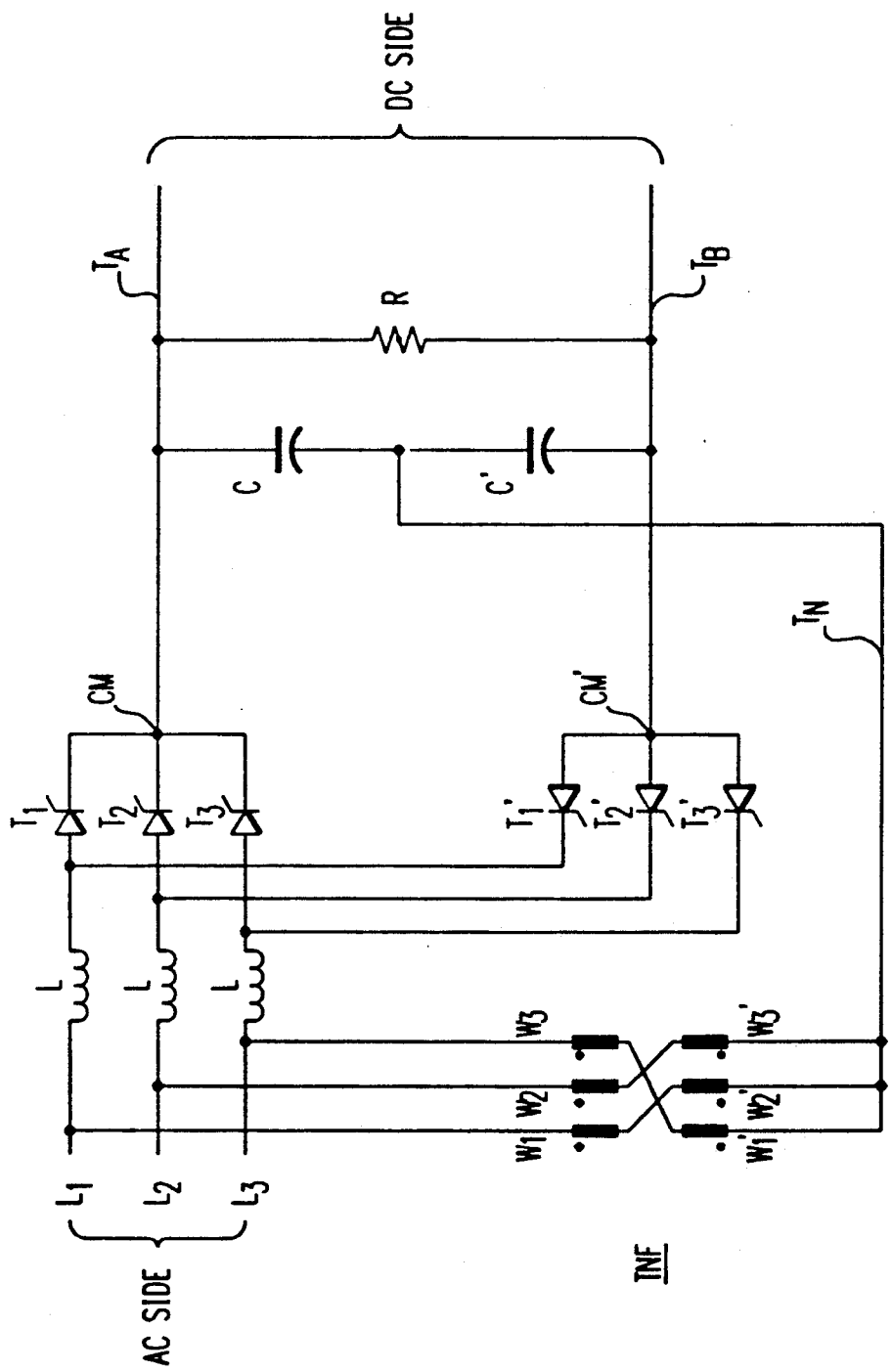
FIG. 3 shows a system using two 3-pulse rectifier groups with a zig-zag interphase transformer providing a neutral point other than the supply source.
Figure 4:
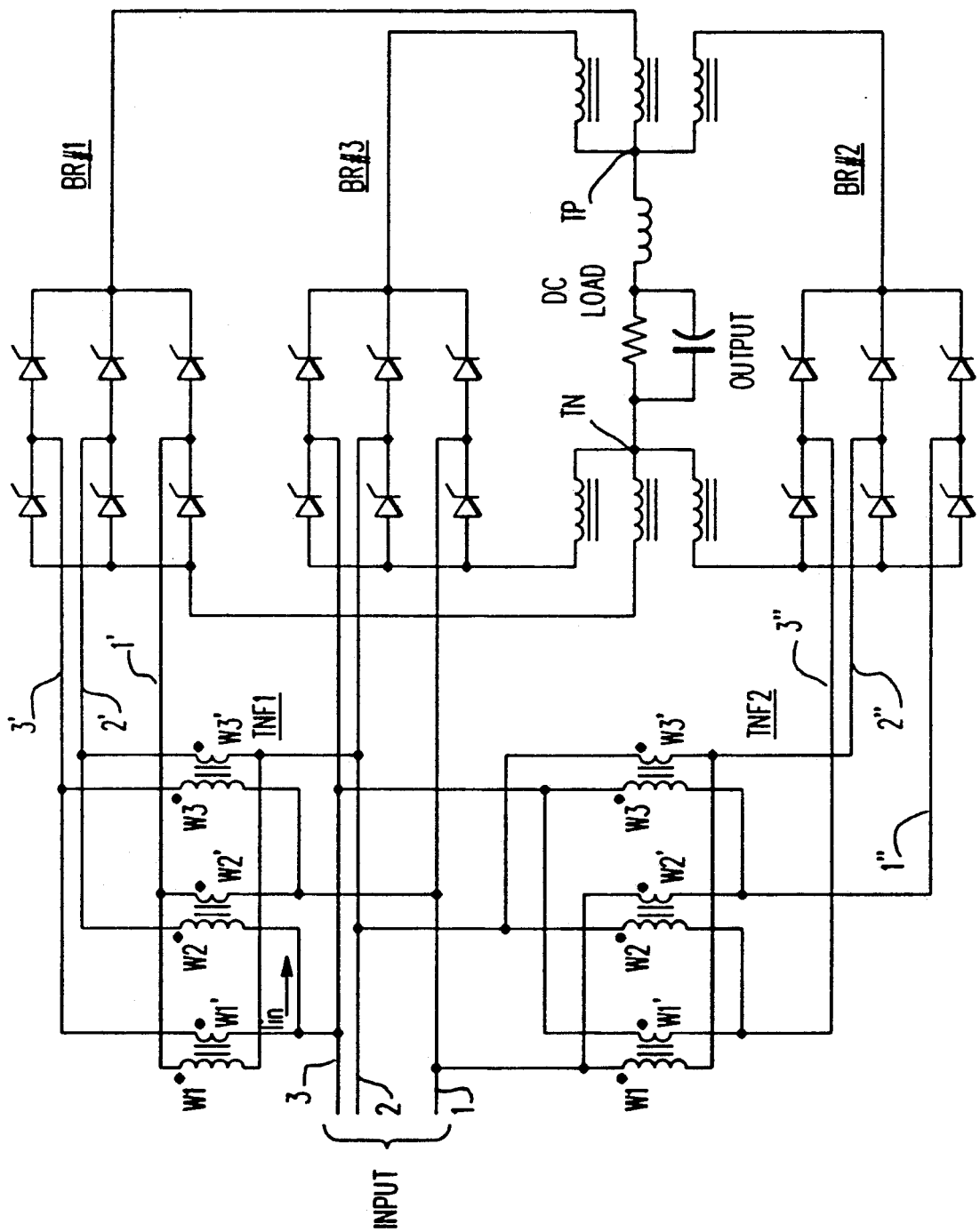
FIG. 4, which is prior art, shows the use of three 6-pulse rectifier bridges staggered at 20 degrees phase shift and with interphase transformers.

Another solution, shown by FIG. 4, consists in using three "building blocks", instead of the two shown in FIG. 3. FIG. 4 shows three 6-pulse rectifier bridges BR#1, BR#2 and BR#3, as disclosed in the incorporated U.S. Pat. No. 4,876,634. The rectifiers are controlled under 120-degree current conduction, and the bridges are staggered by a 20-degree phase shift regarding the incoming power supply voltages. They are interconnected at both ends with an interphase transformer—one with the positive DC terminal TP, the other with the negative DC terminal TN—as shown in FIG. 4. This helps provide a common neutral point like with the approach of FIG. 3.

Figure 5:
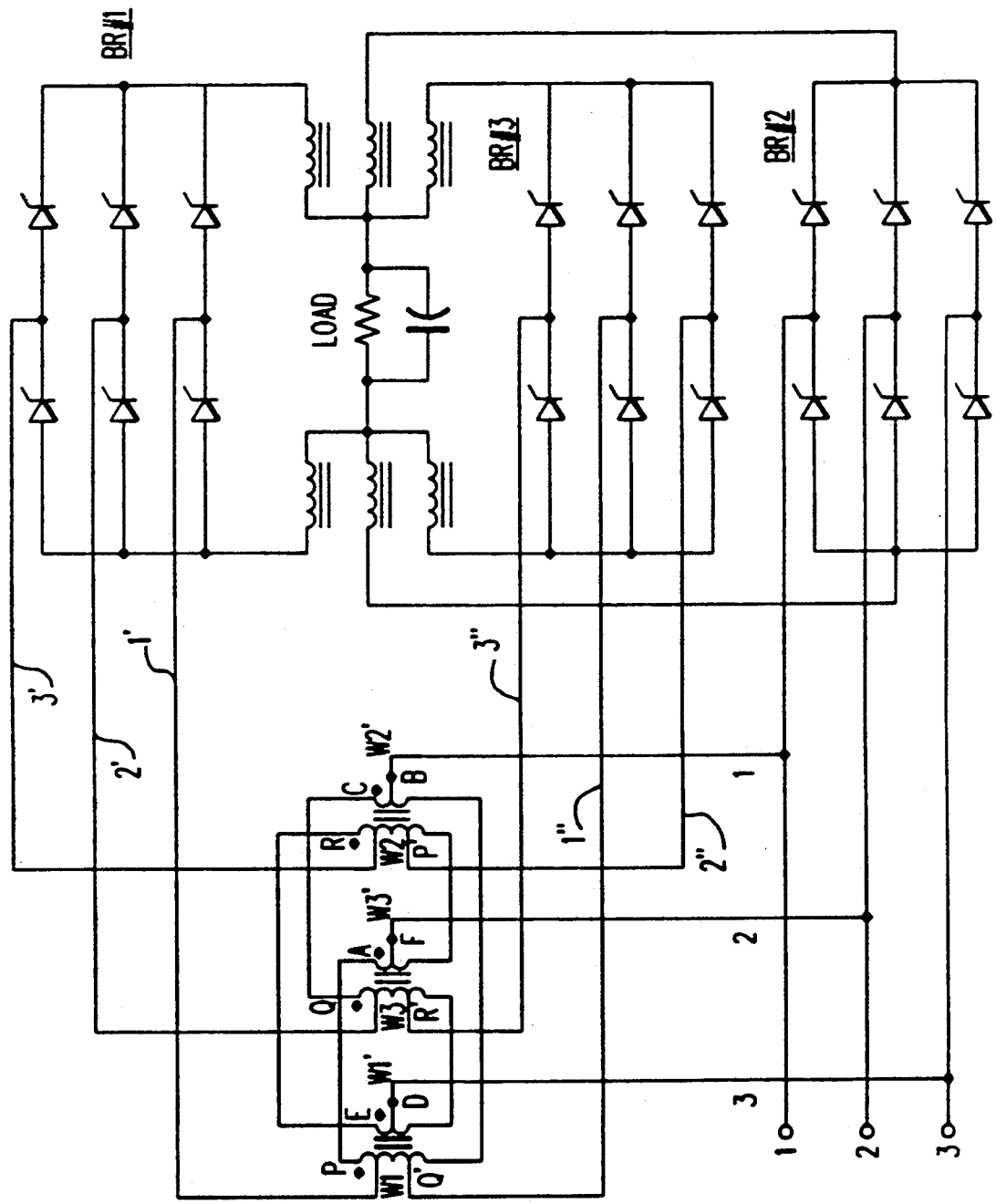
FIG. 5, which is prior art as taken from U.S. Pat. No. 4,876,634, shows an 18-pulse converter using a dual phase shift autotransformer, also combined with three 6-pulse rectifier bridges staggered at 20 degrees and using interphase transformers.
Figure 6:
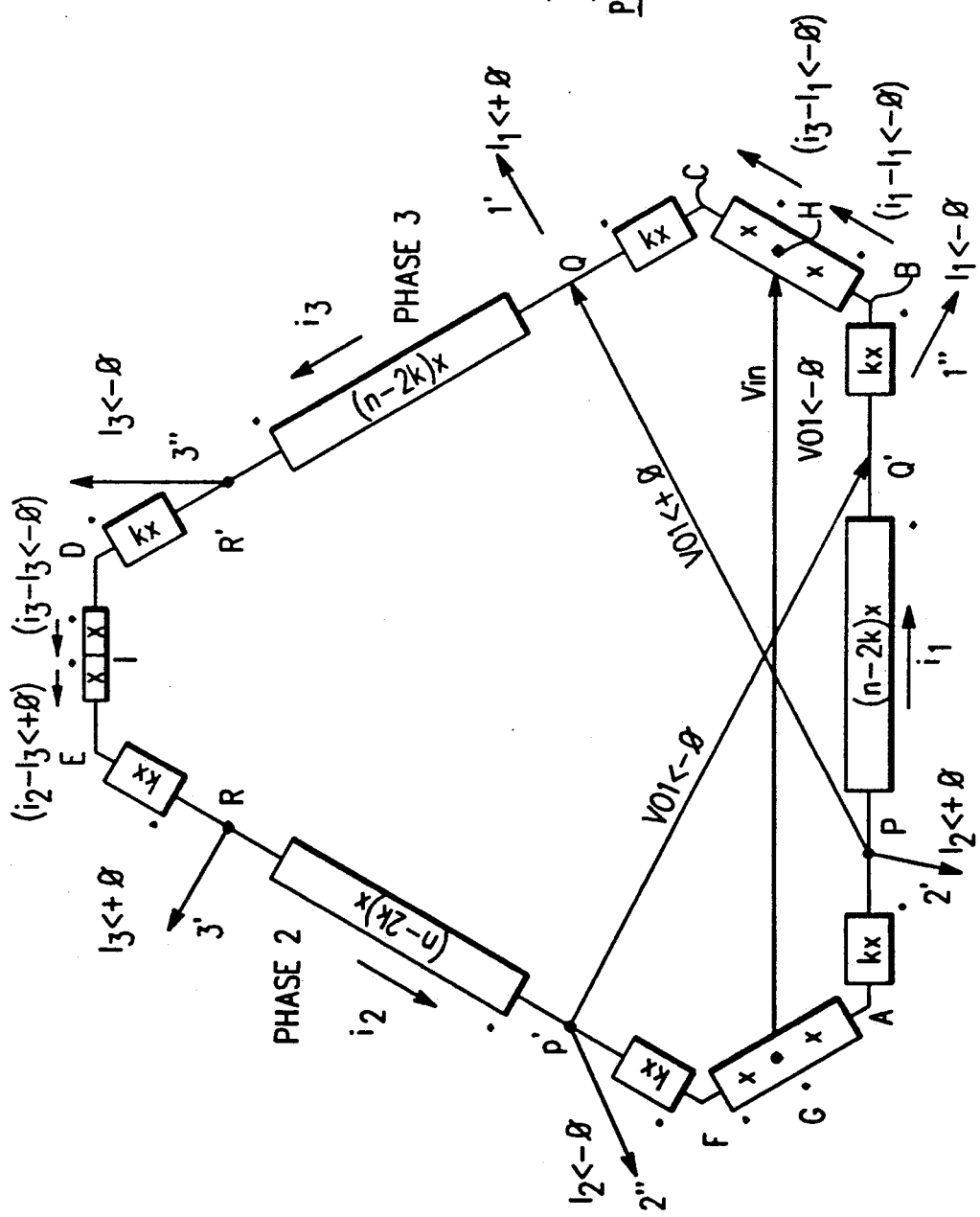
FIG. 6 is a polygonal representation of the dual shift autotransformer of FIG. 5.

FIG. 5 shows as prior art an 18-pulse converter disclosed in U.S. Pat. No. 4,876,634. This converter operates with a polygonal transformer placing each of the lines 1, 2, 3 (for bridge BR #3), 1', 2', 3' (for bridge BR#2) and 1", 2", 3" for bridge BR#1) at a relative phase shift of 20 degrees, and the SCR devices are controlled for 120 degrees of conduction. This polygonal solution is more generally shown in FIG. 6 with the algebraic sum indicated with the outgoing current (I1, I2, I3) at each tapping (P, Q, R, for bridge BR #1 and P', Q', R' for bridge BR #2), the corresponding phase shift being $\phi$ (as given by the windings), a positive voltage phase shift of $+\phi$ for PQ, and a negative voltage phase shift of $-\phi$ relative for GH, where a pair of AC lines is connected. However, as shown in FIG. 5, like in FIG. 4, interphase transformers are used in order to establish neutral points on either side of the DC terminals. This was the approach with a + and $-\phi$ degrees phase shift between two bridges and a 120-degree conduction of current on the rectifiers.

In contrast, with the present invention, the three 6-pulse rectifier bridges are directly connected in parallel across the two DC terminals. Two of the bridges are now under opposite + and −40 degrees phase shift, the third being centrally disposed with zero degree—thus, in phase with the AC lines. Two embodiments are proposed with this approach, as seen with FIGS. 7 and 8.

Figure 7:
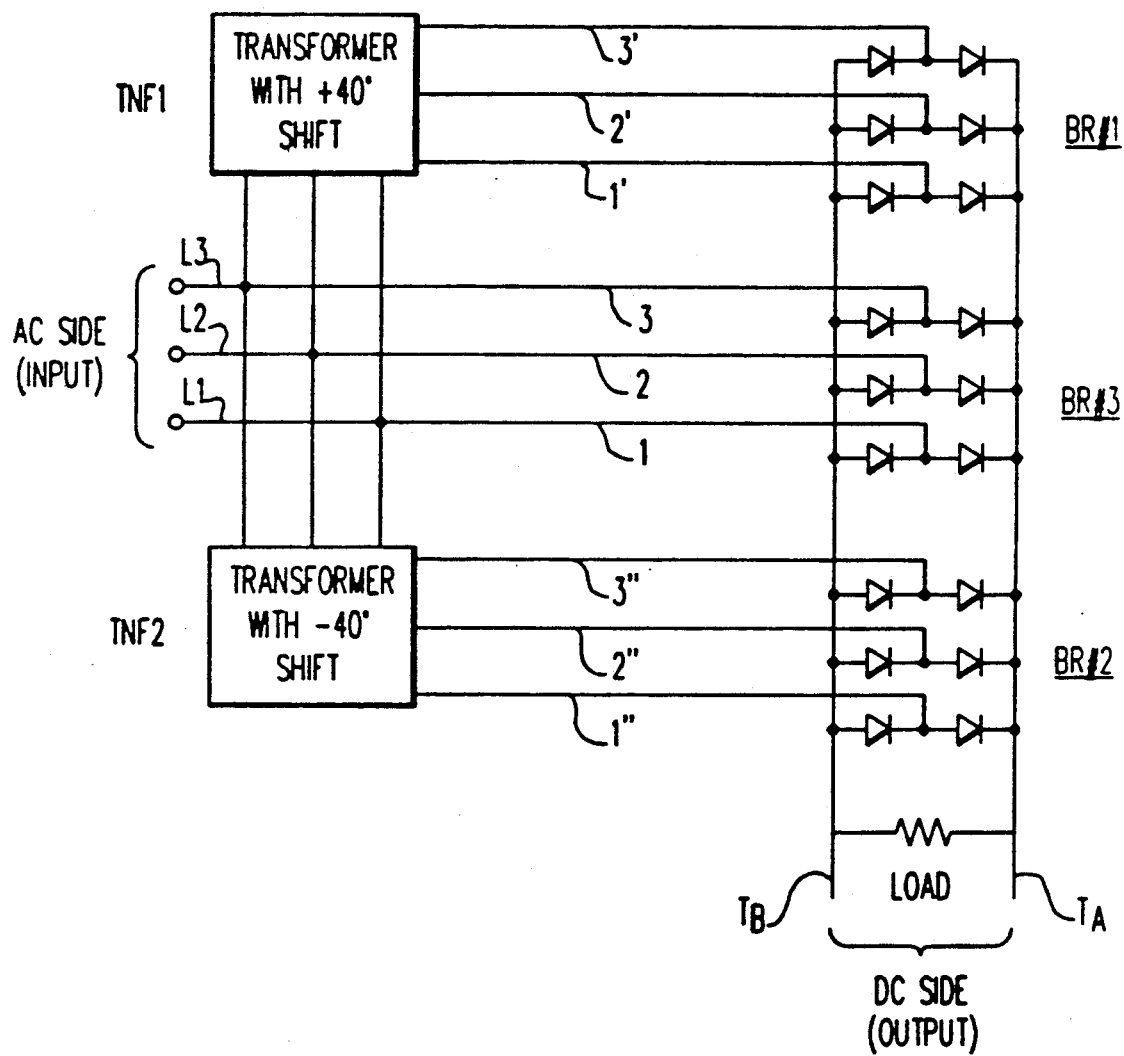
FIG. 7 illustrates the 18-pulse converter according to the invention in an embodiment using three parallel 6-pulse rectifier bridges, two of them under two separate transformers at + and −40 degrees, respectively.

Referring to FIG. 7, two transformers TNF1 and TNF2—one at $-40°$ phase shift, the other at $-40°$ phase shift relative to the AC voltage of the AC lines L1, L2 L3—are coupled to respective rectifier bridges BR #1 and BR #2 by corresponding lines 1', 2', 3' and 1", 2", 3", respectively. AC lines L1, L2, L3 are directly applied by lines 1, 2, 3 to a third rectifier bridge BR#3. Thus, like in FIG. 3, the AC side is with lines L1, L2, L3, whereas, the DC side is between terminals TA and TB at the common terminals of the bridges.

Figure 8:
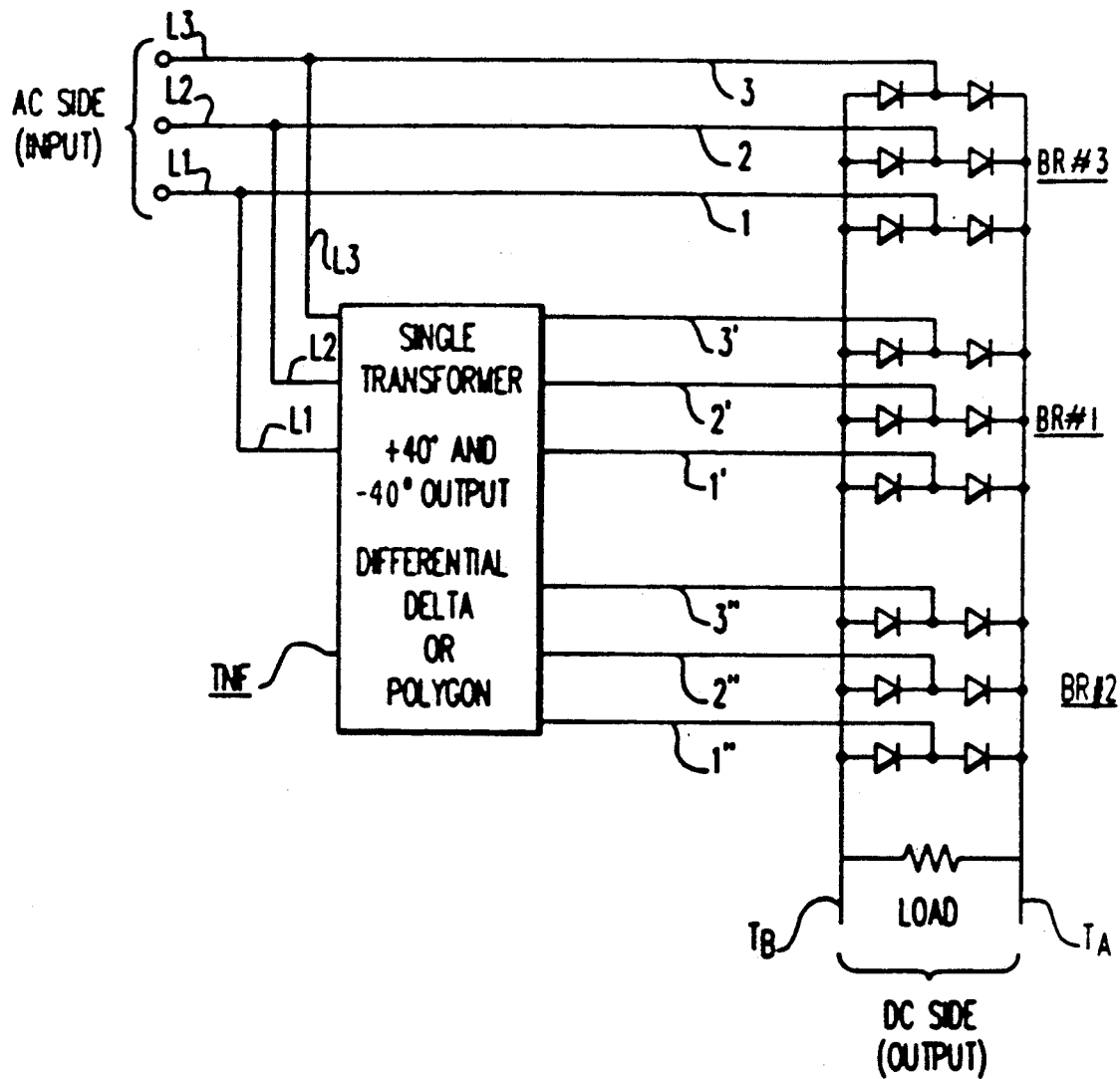
FIG. 8 illustrates a second embodiment of the invention wherein a single transformer is coupled to the three parallel 6-pulse rectifier bridges for generating pulses under ±40 degrees to a corresponding one of two of the bridges and a 0-degree phase shift to the third bridge.

Referring to FIG. 8, another embodiment is shown with a single transformer TNF interposed between the three bridges BR #1, BR #2, and BR #3 on one side and lines L1, L2, L3, on the other side. Again, transformer TNF will provide + and −40° phase shifts between lines 1', 2', 3' to bridge BR #1 and lines 1", 2", 3" to bridge BR #2 relative to a 0-degree phase shift for lines 1, 2, 3, from L1, L2, L3.

Figure 9:
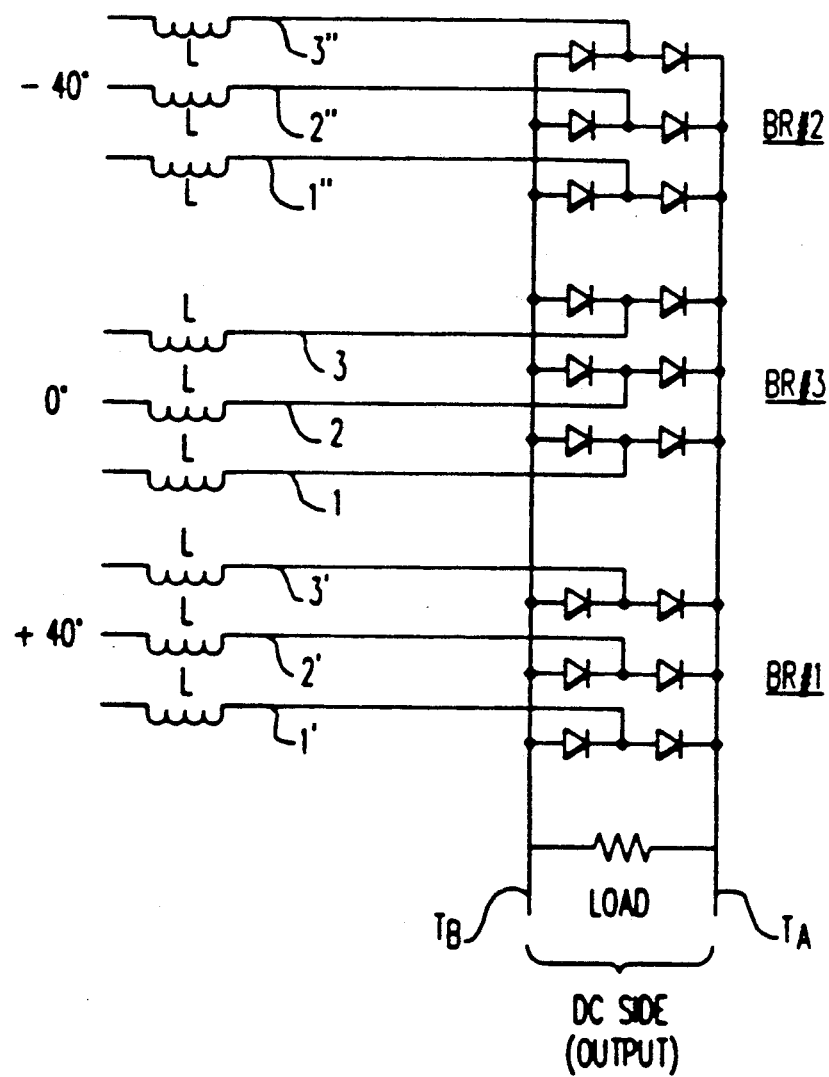
FIGS. 9 and 10 show how, in the absence of a interphase transformer, smoothing inductances are associated with the three rectifier bridges of FIGS. 7 and 8 for high frequency noise elimination.
Figure 10:
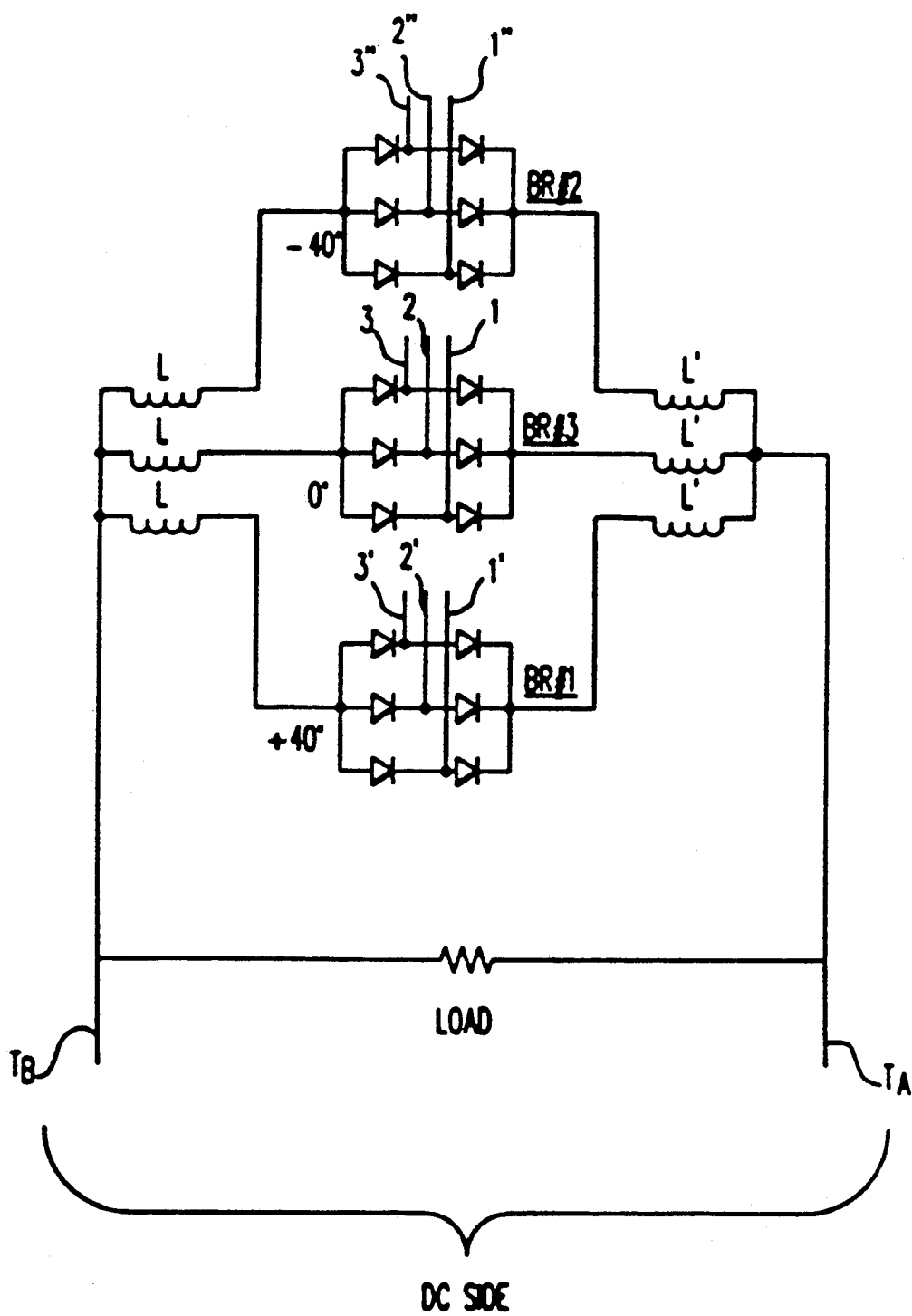

As shown in FIGS. 7 and 8, there is no interphase transformer needed on the rectifier bridge side and no neutral point to be sought for. As a result, each set of rectifier bridge has in common the same individual pairs of serially-connected rectifiers across the two DC terminals and with their midpoint connected to the incoming (or outgoing) AC line. All that is required is a filtering inductance L in order to eliminate any high frequency component on lines 1, 2, 3; 1', 2', 3'; and 1", 2", 3" of the rectifier bridges. In FIG. 9, each line (1, 2, 3; 1', 2', 3'; 1", 2", 3") carries an inductance L. In FIG. 10, two inductances L and L' are inserted on each side of the corresponding bridge and line between terminals TA and TB.

Figure 11:
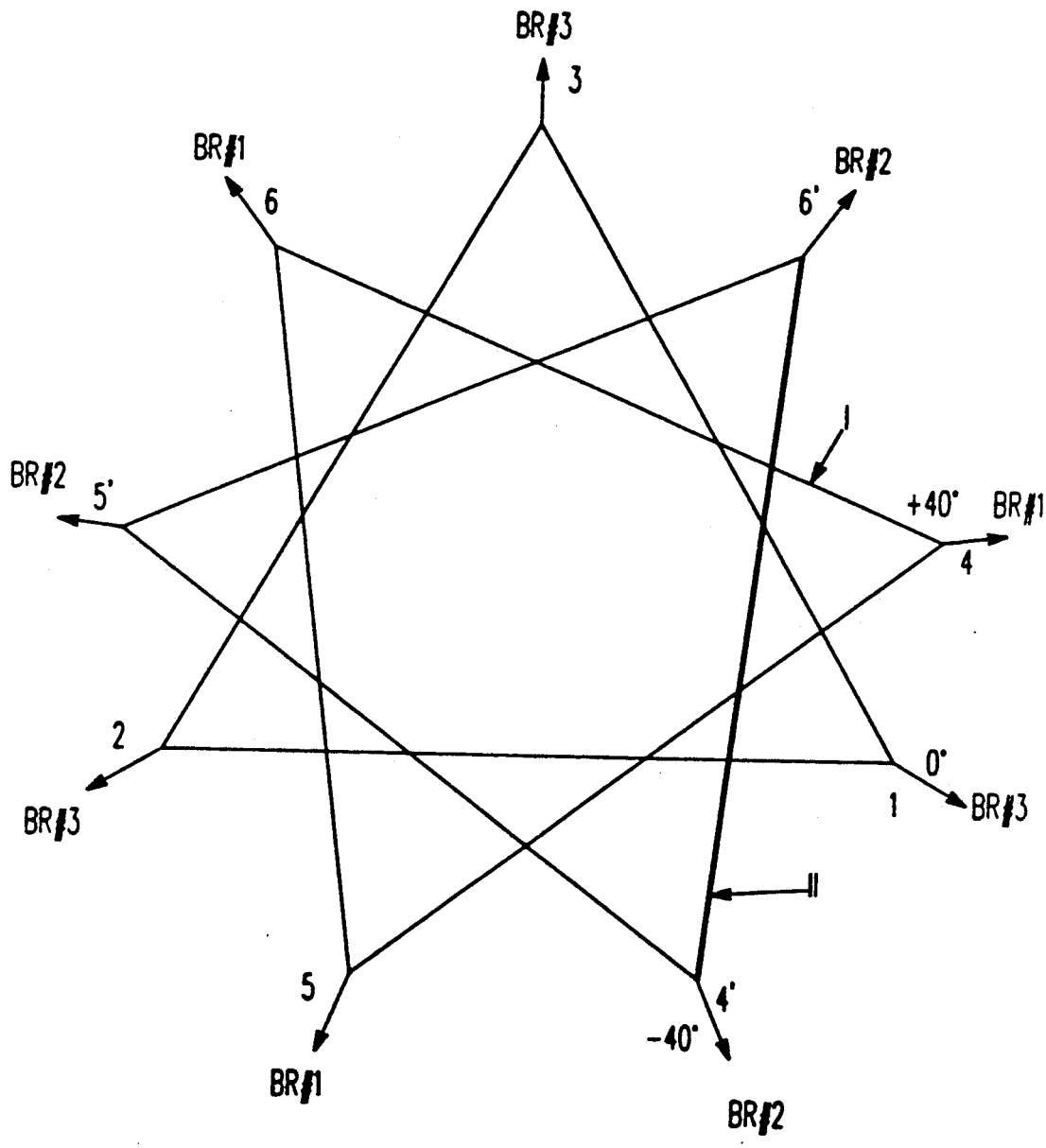
FIG. 11 is a diagram matching FIG. 7 to show the two delta-transformers shifted at + and −40 degrees relative to a common and central delta winding, according to the first embodiment of the 18-pulse converter system of the present invention.

FIG. 11 is a diagram related to the first embodiment of the invention. It shows the voltage vector sets of two transformers (I at +40° phase shift, and II at −40° phase shift), the primary set being shown as a delta diagram at 0 degrees phase shift, thus, in between. Points 1, 2, 3 go to bridge BR #3; points 4', 5', 6' go to bridge BR #2; and points 4, 5, 6 go to bridge BR #1.

Figure 12:
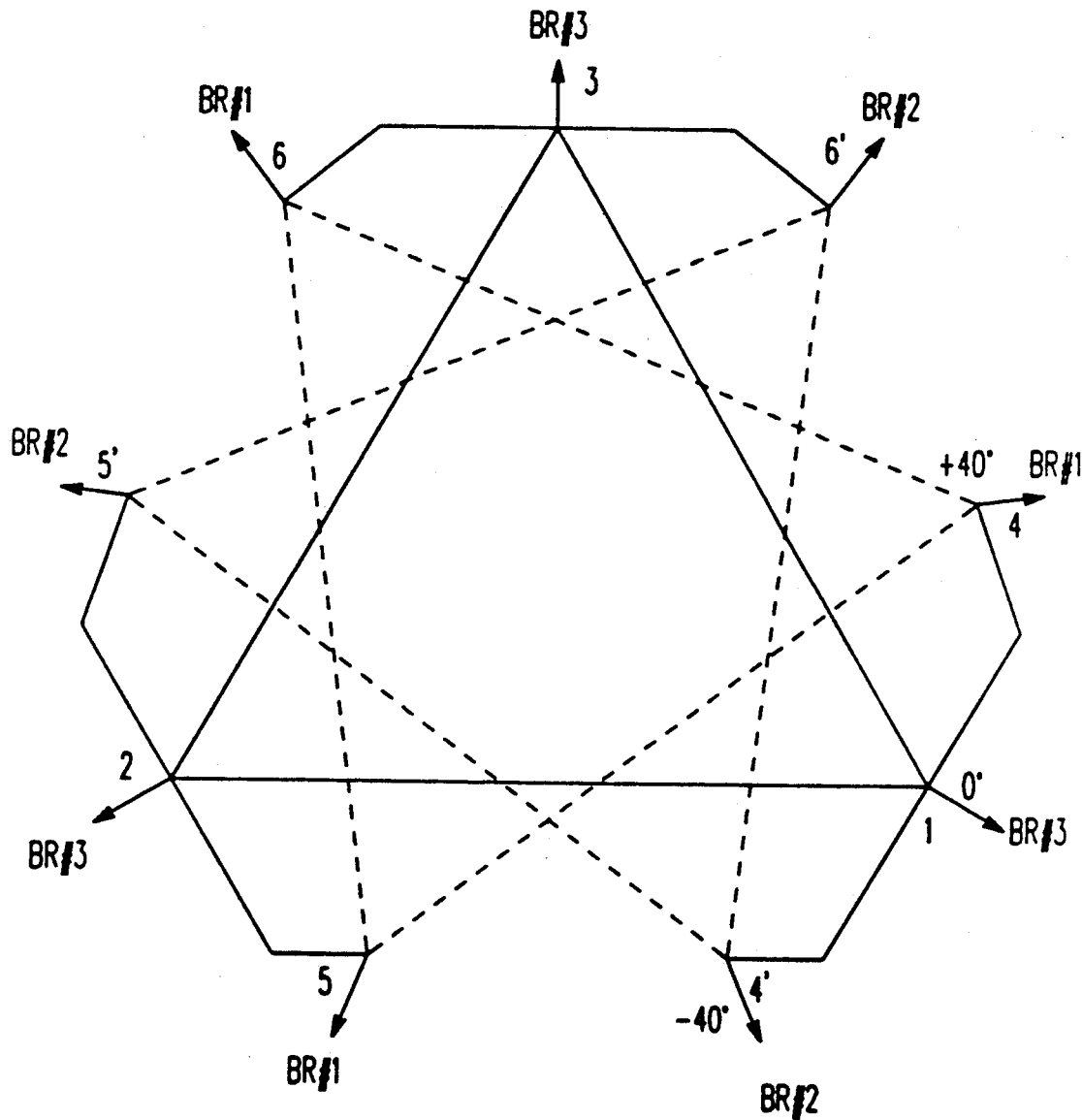
FIG. 12 is a diagram matching FIG. 8 to show a single autotransformer of the differential delta type, as used according to the second embodiment of the 18-pulse converter system of the present invention.

FIG. 12 shows the voltage vectors associated with a single transformer approach in the case of a differential delta, which relates to the second embodiment of the invention. A 18-pulse converter system is shown having the optimized design for such a system. About the central delta 1, 2, 3 are placed, with a single transformer: points 4, 5, 6 at a phase shift of +40° and going to bridge BR #1; tappings 4', 5', 6' at a phase shift of −40° and going to bridge BR #2.

Figure 13:
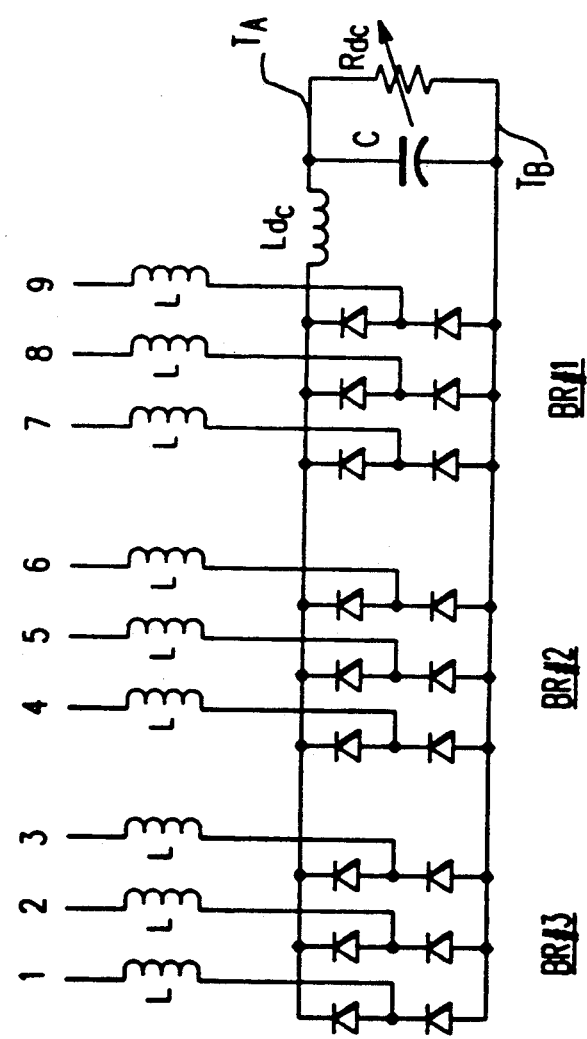
FIG. 13 is a representation of the three parallel 6-pulse rectifier bridges associated FIGS. 11 and 12.

FIG. 13 shows the three bridges—BR #1, BR #2, BR #3—in parallel between the two DC terminals TA, TB and connected individually to the corresponding nine AC lines (1 to 9). There is no interphase transformer. In order to reduce the high frequency current, on each line has been interposed an inductor L, and on the DC side an inductor Ldc before the capacitor C, and a variable resistor Rdc which characterize the DC load.

Figure 14:
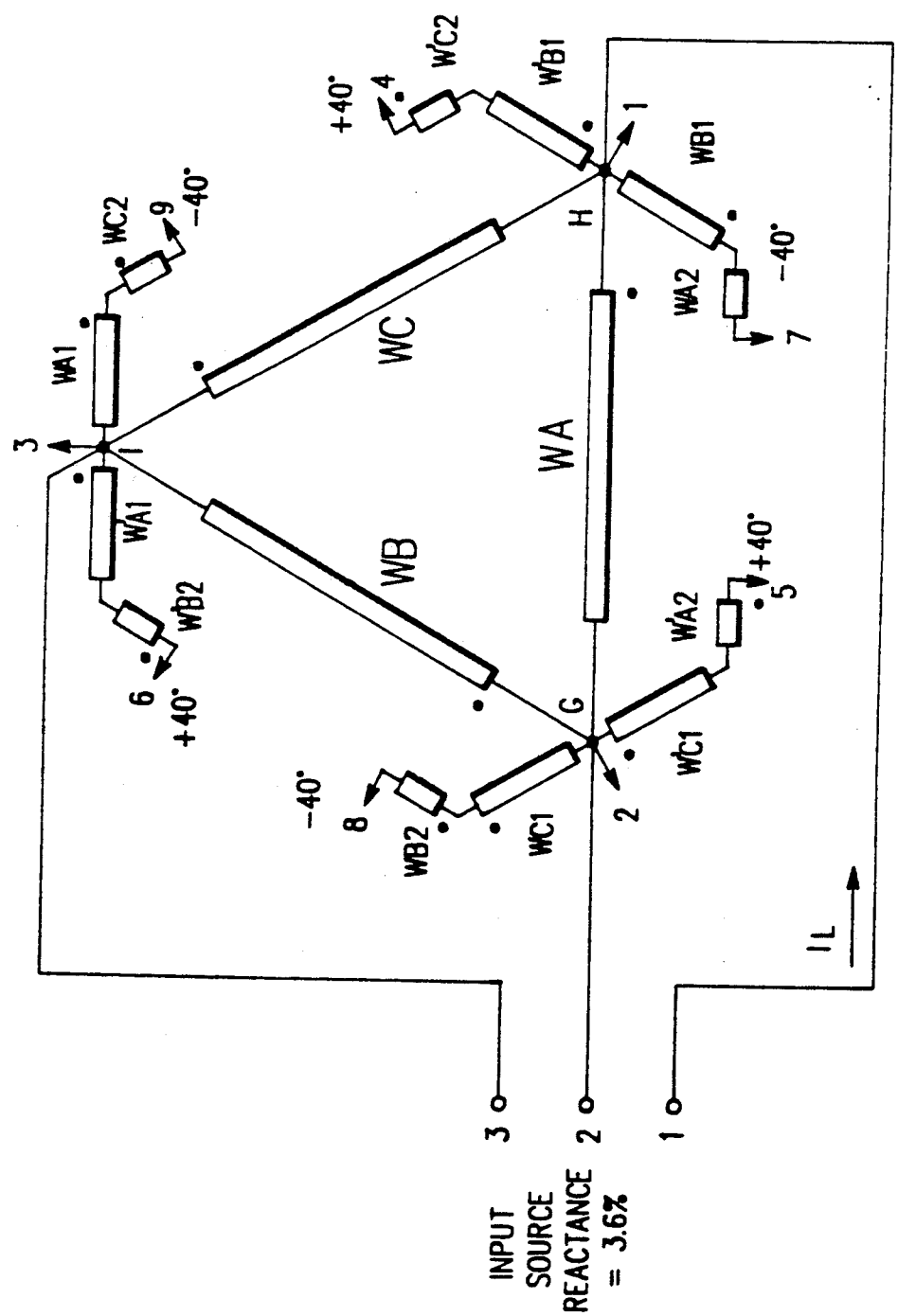
FIG. 14 illustrates the winding distribution according to the embodiment of FIG. 12.

FIG. 14 is the differential delta transformer design matching the general diagram of FIG. 12. WA, WB, WC, disposed about AC lines tappings I, G, H, are the central windings; in fact, the primary windings if the input comes from the AC side. The secondary windings for one of the two bridges, BR #1 and BR #2, are for +40° phase shift: W'A1 and W'B2 associated with tapping 3 (apex I) opposite to winding WA; W'C1 and W'A2 associated with tapping 2 (apex G) opposite to winding WC; and W'B1 and W'C2 for tapping 1 (apex H) opposite to winding WB. W'B2, W'A2 and W'C2 are coupled with windings WB, WA and WC, respectively, while windings W'A1, W'B1 and W'C1 are coupled to windings WA, WB, WC, respectively. The same can be said for the −40° phase shift pairs of windings WA1 and WC2 (apex I), WC1 and WB2 (apex G), WB1 and WA2 (apex H). The sizes of the windings are, typically, 58 turns for WA, WB or WC; 17 turns for WA1, W'A1, WB1, W'B1, WC1 and W'C1; 9 turns for WA2, W'A2, WB2, W'B2, WC2, W'C2. Another possible set of windings would be 65, 19 and 10 for the respective number of turns for the main, intermediate, and smallest windings.

To explain the performance of the + and −40° phase shift relative to the central triangle 1, 2, 3, it is noted that the third harmonic has a zero sequence, while no phase shift does occur as it passes through the transformer. Thus, if the third harmonic current from the converter directly connected to the source is assumed to be at zero degrees phase, the leading (+40°) converter will have third harmonic current at 3×40°, i.e. 120°, whereas the lag converter (−40°) will have third harmonic current at 3×−40°, i.e. −120°. Thus, the 3-phase set of third harmonic currents cancels and there is no resultant third harmonic drawn from the source. Similarly, the negative and positive sequence sets of 5, 7, 11, 13 harmonics are phase-shifted as they pass through the transformer. The negative sequence shifts through an angle opposite to that of the positive sequence. For example, considering the fifth harmonic in the +40°, transformer, the phase shift, with respect to the source, is (5×40°) +40°, i.e. 240°. Likewise, in the −40° shift transformer, it is (5×−40) −40°, i.e. −240°. Thus, the three sets of fifth harmonic currents sum to zero from the source. Similar reasoning leads to observe that there is also an elimination of the 7, 11, 13 harmonics.

Considering the central 6-pulse rectifier bridge, a 30-pulse converter system can be designed under the same principle by adding four instead of two symmetrically shifted bridges in conjunction with a bridge having no phase shift. In such case, two will be at + and −48 degrees phase shift, two will be at + and −24 degrees phase shift, and one will be at zero degree phase shift. One can go higher by using 7 bridges, instead of 5; namely, 1+6-pulse bridges.

Figure 15:
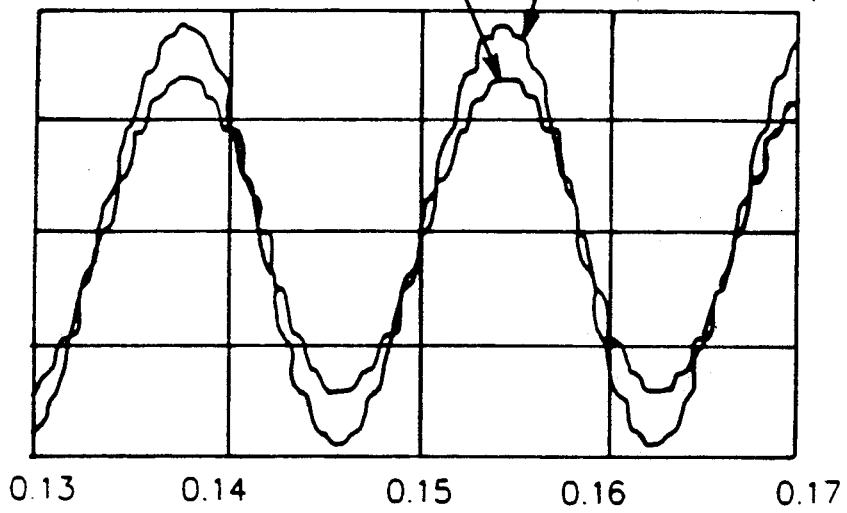
FIGS. 15 and 16 illustrate with curves the input current and voltage waveforms obtained with two different values of the inductance components used in the rectifier bridges of FIG. 13.
Figure 16:
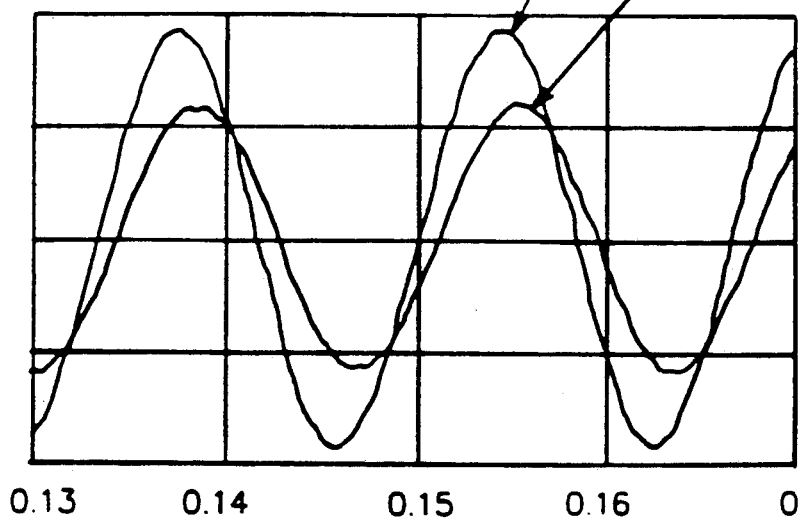

FIGS. 15 and 16 represent the line-to-neutral voltage at the transformer output (V) and the flowing current $I_L$ for (1) L=0.003% and Ldc/Rdc=1.2 ms; and (2) Ldc=0, both in the case of FIG. 13.

Figure 17:
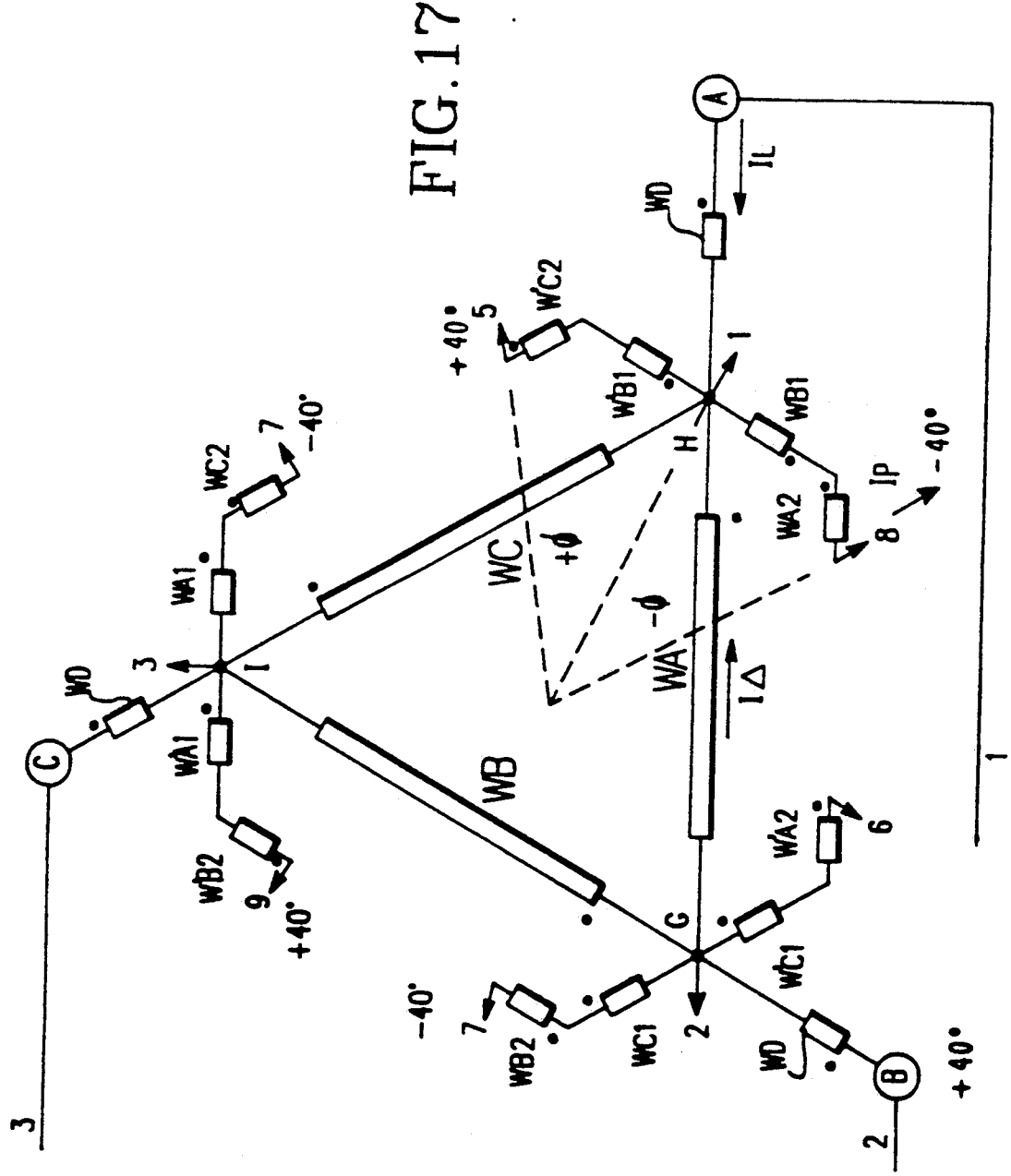
FIGS. 17, 18, and 19 are illustrating modifications to the winding distribution shown in FIG. 14 according to three respective embodiments of the invention.

FIG. 17 is like FIG. 14, but modified by the adjunction of a winding WD placed as an extension of each side (WA, WB, or WC) of the triangle GHI. The three AC lines 1, 2, 3 are connected to one end of the added windings WD, respectively, while the other end thereof is connected to an associated apex of the triangle. The effect is to reduce the DC output to the extent of the ampere-turns of the added winding WD.

Figure 18:
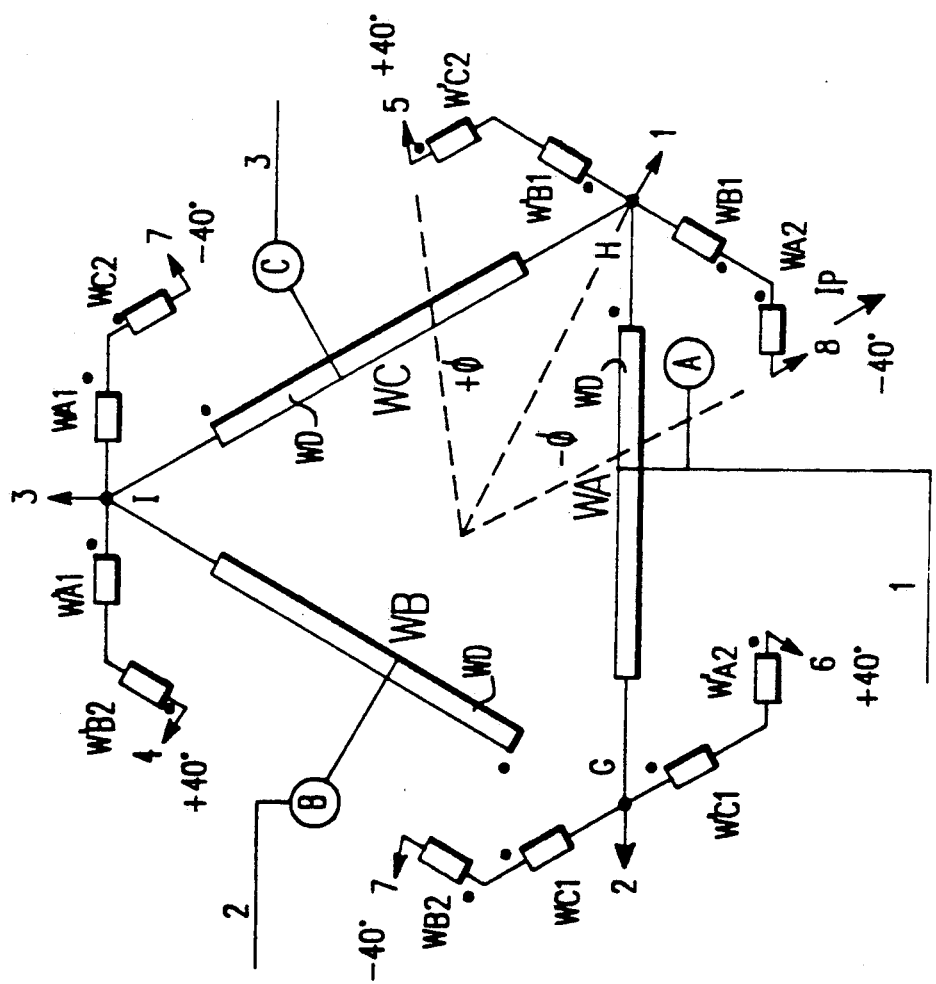

FIG. 18 is like FIG. 14, but instead of decreasing the DC output, a winding WD is added in such a way that the DC output is increased. This effect, the AC lines 1, 2, 3, instead of being connected directly to the respective apices of the triangle GHI, they are connected to a tapping of the main delta windings. Instead of a full delta winding WA, WB or WC, as in FIG. 14, such winding is merely a fraction of the main triangle winding, and the complementary fraction on the triangle is the winding WD of FIG. 17, used now as a subtrahend.

Figure 19:
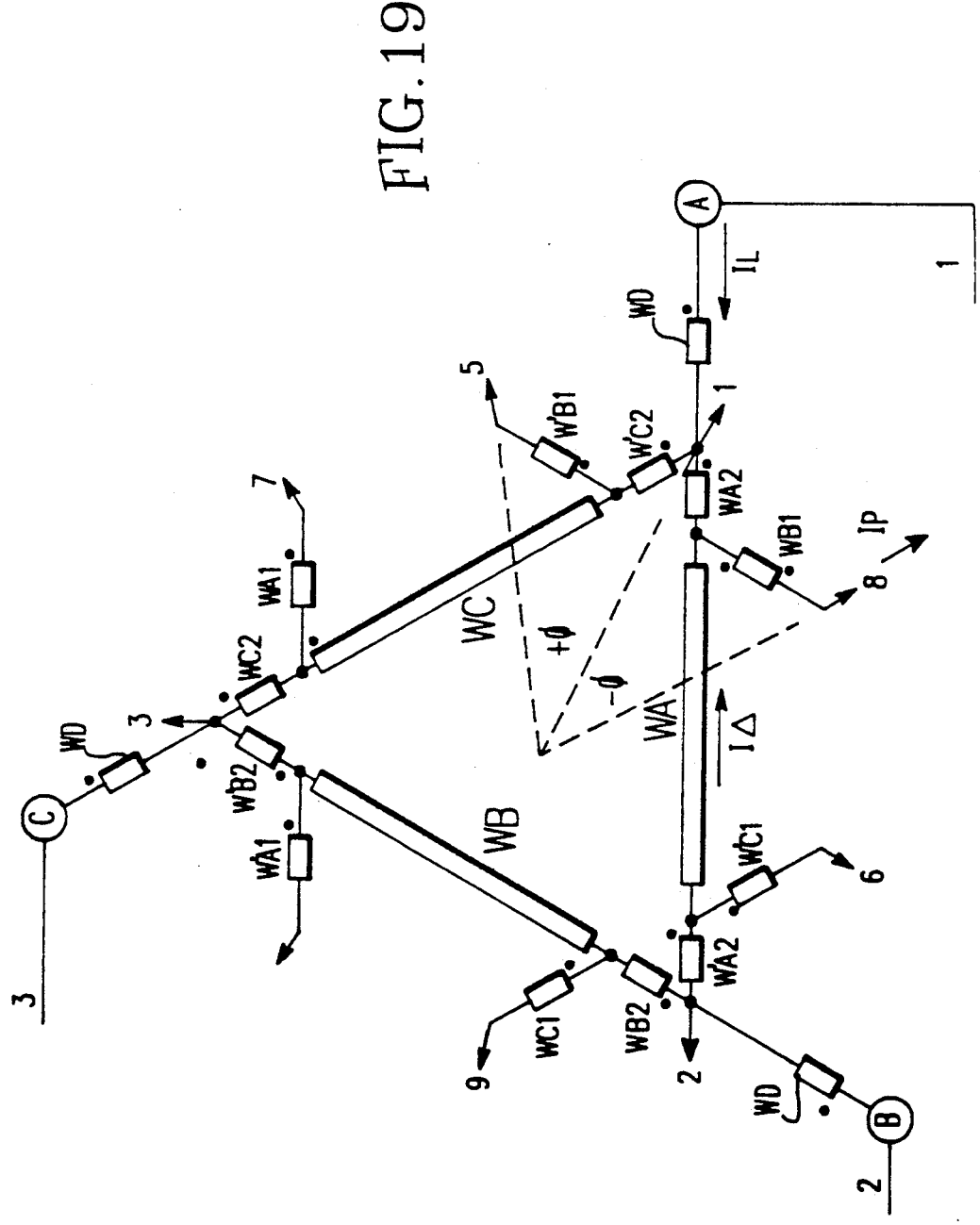

FIG. 19 shows an alternative arrangement for the winding system of FIG. 14, regarding the pairs of windings creating a 40° phase shift in either direction (W'C2, W'B1 and WB1, WA2 for tapping 1; W'A2, W'C1 and WC1, WB2 for tapping 2; or W'B2, W'A1 and WA1, WC2 for tapping 3). Windings WA2 and W'A2 which are closest to the main winding WA, to which they are coupled from either end, are now inserted between a corresponding end of WA and the associated apex of the main triangle. The same is done for WB2 and W'B2 regarding main winding WB, and also for WC2 and W'C2 regarding main winding WC. The complementary winding of each pair, thus the one (WB1 and W'B1 for apex H, or WC1 and W'C1 for apex G, or WA1 and W'A1 for apex I) which is remote from the main winding (WB, WC, or WA) to which it is coupled, is branched to the nodal point between the adjacent main winding (WA and WC for apex H, WB and WA for apex G and WC and WB for apex I), and the inserted winding (WA2 with WA for WB1, W'C2 with WC for W'B1; W'A2 with WA for W'C1, WB2 with WB for WC1, etc.). For more generalization, the embodiment of FIG. 19 also shows a winding WD being inserted on each apex of the triangle with the respective AC lines 1, 2, 3.

What is claimed is:

1. A static converter system operating between opposite ones of respective AC and DC buses and comprising: at least three rectifier bridges connected in parallel to said DC buses, each rectifier bridge having three AC lines connected to the middle point of two rectifier devices in series between the two DC buses, the AC lines of one rectifier bridge being directly connected to said AC buses; and an autotransformer interposed between said AC buses and the respective AC lines of the three rectifier bridges; said autotransformer having three double pairs of adjacent windings inscribed in an hexagon, each pair of winding being symmetrically disposed about the apex of an equilateral triangle inscribed in the hexagon and defined by said three AC buses; one end of a double pair of windings being connected to one of said rectifier bridges, the other end of a double pair windings being connected to a second of said rectifier bridges and the midpoint of a double pair being connected to the third of said rectifier bridges; three main windings coupled to said double pairs of windings being connected between said apexes; said one and other end of a double pair of windings being at + and −40 degree phase shift in relation to the associated apex; and the rectifier devices of said rectifier bridges being controlled for conduction for 40 electrical degrees; whereby the system is a converter of at least 18 pulses.

2. The system of claim 1 with one winding of a pair being coupled with the main winding opposite to the associated apex, and the other winding of a pair being coupled with one of the main windings adjacent to said associated apex.

3. The system of claim 1 with filtering inductors being interposed on each of said AC lines.

4. The system of claim 1 with filtering inductors being interposed between each rectifier bridge and said DC buses so as to operate individually.

5. A multipulse converter system operating between opposite ones of respective AC and DC buses and comprising: at least three rectifier bridges ,connected in parallel to said DC buses, each rectifier bridge including a pair of serially connected rectifier devices about a midpoint, AC lines being derived from said midpoints, the, AC lines of one of said bridges being directly connected to said AC buses; three main windings being connected in delta in an order of succession between said AC buses; and two sets of three windings coupled to said main windings being provided, one at +40 degree phase shift therefrom, the other at −40 degree phase shift therefrom; the AC lines of the two other said rectifier bridges being connected to a corresponding one of said coupled three windings; whereby the system is a converter system of at least 18 pulses.

6. The system of claim 5 with filtering inductors being interposed on each of said AC lines.

7. The system of claim 5 with filtering inductors being interposed between each rectifier bridge and said DC buses so as to operate individually.

8. The system of claim 5 with one of said two sets of three windings being coupled to two main windings preceding the associated delta apex in said order of succession, and the other of said two sets of three windings being coupled to two main windings situated behind the associated delta apex in said order of succession.

9. The system of claim 8 with each of said three windings of a set including a pair of windings, one being coupled to one main winding, the other being coupled to the second main winding of said two main windings.

10. The system of claim 9 with one winding of a pair in each set being connected between one end of a main winding and the delta apex associated with said end.

11. The system of claim 8 with the AC lines being connected to the respective apices of said delta connected main windings, an additional winding being connected between each AC line and the associated delta apex, thereby to decrease the voltage on the DC side.

12. The system of claim 8, with each of the AC lines being connected to a tapping of a main winding in the order of succession thereof, thereby to increase the voltage on the DC side.

* * * * *